(12) United States Patent
Yamazaki et al.

(10) Patent No.: US 8,664,887 B2
(45) Date of Patent: Mar. 4, 2014

(54) XENON LAMP DRIVE UNIT, METHOD FOR DRIVING XENON LAMP, AND ARTIFICIAL SOLAR LIGHT IRRADIATION UNIT

(75) Inventors: Yuya Yamazaki, Gyoda (JP); Tooru Nagase, Gyoda (JP); Katsuaki Okubo, Gyoda (JP); Shinichi Suzuki, Gyoda (JP)

(73) Assignee: Iwasaki Electric Co., Ltd, Chuo-ku, Tokyo (JP)

( * ) Notice: Subject to any disclaimer, the term of this patent is extended or adjusted under 35 U.S.C. 154(b) by 146 days.

(21) Appl. No.: 13/371,736

(22) Filed: Feb. 13, 2012

(65) Prior Publication Data

US 2012/0299508 A1    Nov. 29, 2012

(30) Foreign Application Priority Data

May 27, 2011  (JP) .................................. 2011-119032

(51) Int. Cl.
*H05B 41/36*    (2006.01)

(52) U.S. Cl.
USPC .......................................... 315/291; 315/352

(58) Field of Classification Search
USPC ................. 315/291, 307, 308, 208, 224, 226, 315/241 R, 200 R, 349, 352
See application file for complete search history.

(56) References Cited

U.S. PATENT DOCUMENTS

| | | | |
|---|---|---|---|
| 5,491,388 A * | 2/1996 | Nobuyuki et al. | ............ 315/308 |
| 2011/0069479 A1 | 3/2011 | Hashimoto et al. | |
| 2012/0172950 A1 | 7/2012 | Choi et al. | |

FOREIGN PATENT DOCUMENTS

| | | |
|---|---|---|
| JP | 2009-283846 | 12/2009 |
| KR | 10-2005-0030777 | 3/2005 |
| KR | 10-2011-0028247 | 3/2011 |

OTHER PUBLICATIONS

Korean Office Action (Application No. 10-2012-0020730) dated Jun. 5, 2013.

* cited by examiner

*Primary Examiner* — Daniel D Chang
(74) *Attorney, Agent, or Firm* — Eric J. Robinson; Robinson Intellectual Property Law Office, P.C.

(57) ABSTRACT

A xenon lamp drive unit of the present invention comprises: a charging circuit; and a current control circuit adapted to supply a current to a xenon lamp by using a charged voltage of the charging circuit as a power source, wherein the current control circuit is adapted to supply, in a first period after a lamp ignition, a high output lamp current having a higher current value than a steady output lamp current to the xenon lamp by constant current control and supply, in a second period after the first period, the steady output lamp current to the xenon lamp by constant current control.

3 Claims, 5 Drawing Sheets

XENON LAMP DRIVE UNIT, METHOD FOR DRIVING XENON LAMP, AND ARTIFICIAL SOLAR LIGHT IRRADIATION UNIT

BACKGROUND OF THE INVENTION

1. Field of the Invention

The present invention relates to a xenon lamp drive unit used for an artificial solar light irradiation unit which radiates artificial solar light, and a method for driving a xenon lamp.

2. Description of the Related Art

An artificial solar light irradiation unit is known which irradiates an irradiation target with artificial solar light reproducing the spectral distribution of natural solar light for measurement of performances of various apparatuses utilizing solar energy, such as photoelectric conversion characteristics of solar cells. In an artificial solar light irradiation unit of this kind, a light source including a xenon lamp (hereinafter referred to as "lamp") is set in a box, and light from the light source passes through an optical filter and thereby is radiated as artificial solar light from a radiation surface.

The artificial solar light irradiation unit uses a lamp having an emission length of 1000 mm or more, for example; is supplied with a direct lamp current; and controls the illuminance on an irradiation surface by adjusting the value of the lamp current with a drive unit. In general, the lamp current for driving is about several tens of amperes (for example, 70 A), and the lamp voltage is about several hundreds of volts (for example, 500 V). The lamp current/voltage are supplied/applied for several tens mSec to several hundreds mSec per flash. This output state is controlled by using a constant current or a constant power, and the performances of the irradiation target are measured during the period of the driving. For example, Japanese Patent Application Laid-open No. 2009-283846 discloses an artificial solar light irradiation unit in which the lamp current is controlled by using a constant current.

In the above case, the lamp power is 35 kW, which causes the following problems. Specifically, when the power is supplied directly from mains electricity supply even for an instant (for example, 100 mSec), peripheral devices on the same line of the mains electricity supply are adversely affected. Moreover, a large-capacity contact and a large-capacity wiring are necessary between the mains electricity supply and an irradiation unit. For these reasons, a configuration is employed in general in which a drive unit is provided in the irradiation unit, and the drive unit stores power, and supplies the stored power to a lamp in response to an operation instruction.

SUMMARY OF THE INVENTION

When the characteristics of an irradiation target such as a solar cell panel are measured by irradiating the irradiation target with artificial solar light, it is desirable that the artificial solar light always have the same level of illuminance in every flash for accurate measurement of the characteristics. In the actual use, however, sudden higher illuminance may sometimes occur during multiple times of flashes. This is due to unstable lamp voltage of the xenon lamp. FIG. 8 shows lamp voltages for respective flashes in a conventional case. As can be understood from FIG. 8, it is observed that some lamp voltages are higher than others. Since the lamp is driven by a constant current, the higher lamp voltage causes the supplied power to increase accordingly resulting in the increased luminance. The fluctuation of the luminance of the artificial solar light during measurements causes the precision of characteristics measurement of the solar cell panel to deteriorate. Moreover, in a case of a unit in which multiple xenon lamps are placed, and are driven simultaneously for irradiation over a wide area, uniform light cannot be obtained if the illuminance varies among the lamps.

Under such circumstances, an object of the present invention is to provide a xenon lamp drive unit and a method for driving a xenon lamp, which provide stable illuminance among flashes by applying lamp current control in consideration of the lamp characteristics as described above.

A first aspect of the present invention is a xenon lamp drive unit comprising: a charging circuit (200); and a current control circuit (300) adapted to supply a current to a xenon lamp by using a charged voltage of the charging circuit as a power source. The current control circuit is adapted to supply, in a first period after a lamp ignition, a high output lamp current having a higher current value than a steady output lamp current to the xenon lamp by constant current control and supply, in a second period after the first period, the steady output lamp current to the xenon lamp by constant current control.

A second aspect of the present invention is a method for driving a xenon lamp in a use of a xenon lamp drive unit including a current control circuit (300) adapted to supply a current to a xenon lamp by using a charged voltage of a charging circuit (200) as a power source. The method comprises the steps of: at the current control circuit, in a first period after a lamp ignition, supplying a high output lamp current having a higher current value than a steady output lamp current to the xenon lamp by constant current control; and, in a second period after the first period, supplying the steady output lamp current to the xenon lamp by constant current control.

A third aspect of the present invention is an artificial solar light irradiation unit comprising the xenon lamp drive unit of the first aspect; a xenon lamp connected to the xenon lamp drive unit; and a casing in which the xenon lamp is attached.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
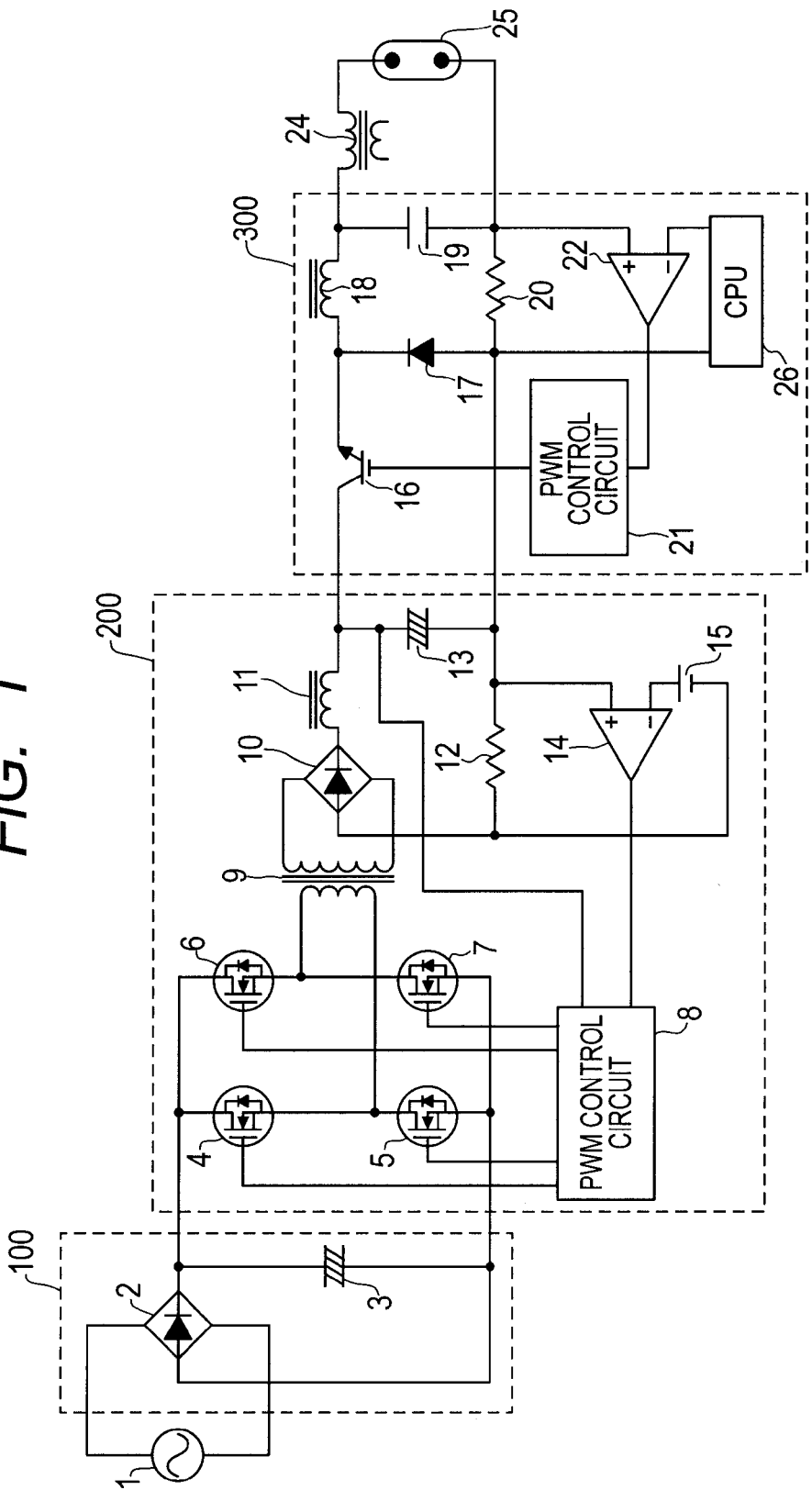
FIG. 1 shows a xenon lamp drive unit of the present invention.

FIG. 1 shows a xenon lamp drive unit used in an embodiment of the present invention. In the drive unit, a direct-current power source circuit 100 including a rectifier 2 and a smoothing capacitor 3 converts an alternating current power source 1 into a direct-current voltage, and the direct-current voltage is supplied to the charging circuit 200. The charging circuit 200 includes an inverter including transistors 4, 5, 6, and 7. In response to a charge instruction directed to the charging circuit 200, a PWM control circuit 8 controls conduction times of the transistors 4 and 7 and the transistors 5 and 6, so that the transistors 4 and 7 and the transistors 5 and 6 are alternately made conductive at a high frequency. As a result, an alternating voltage is generated in a primary winding of a transformer 9, and a voltage which depends on a transformer ratio is generated in a secondary winding of the transformer 9. The voltage generated in the secondary winding of the transformer 9 is rectified by a rectifier 10, smoothed in a coil 11, and charged to a high-capacitance electrolytic capacitor (charge capacitor) 13. Here, an input voltage proportional to a charging current sensed by a current sensing resistor 12 and a reference voltage 15 are inputted to an error amplifier 14, and the PWM control circuit 8 performs a PWM control on the conduction times of the transistors 4 to 7 so that both voltages can be equal. As a result, the high-capacitance charge capacitor 13 is charged by a constant current having a predetermined current value. When the charge capacitor 13 is charged to a voltage sufficiently higher than a lamp voltage (for example, 1000 V), the PWM control circuit 8 temporarily stops the operation of the inverter (or retains the charged voltage), and takes a standby state.

Next, in response to a lamp operation instruction, the current control circuit 300 starts operating. The current control circuit 300 includes a step-down chopper circuit. The step-down chopper circuit includes a semiconductor switch 16 such as an IGBT, a diode 17, a coil 18, a capacitor 19, a current sensing resistor 20, a PWM control circuit 21 for controlling conduction time of the semiconductor switch 16, an error amplifier 22, and a feedback element (not shown). At this point, a direct-current voltage (1000 V) which is approximately equal to the voltage of the charge capacitor 13 is immediately applied across a lamp 25. After that, a pulse transformer 24 of an igniter (not illustrated) superposes a pulse voltage on the direct-current voltage, so that electrical breakdown of the lamp 25 occurs.

When electrical breakdown of the lamp 25 occurs, a restricted current is supplied from the current control circuit 300 to the lamp 25 by using the charged voltage of the capacitor 13 as a power source. In the current control circuit 300, a voltage signal (a sensed voltage) proportional to a lamp current sensed by the current sensing resistor 20 and a variable voltage signal from a CPU 26 proportional to a lamp current setting vale are inputted to the error amplifier 22 in response to the operation instruction, and the PWM control circuit 21 performs a PWM control on the conduction time of the semiconductor switch 16 so that both voltages can be equal. As a result, a constant current control of direct current operation of the lamp 25 using the capacitor 13 as a power source is carried out according to the lamp current setting value. Note that the CPU 26 may be inside or outside the current control circuit 300.

Hardware portions of the drive unit shown in FIG. 1 are general ones. In the embodiment of the present invention, a waveform of a lamp current outputted from the current control circuit 300 is different from a conventional waveform shown in FIG. 7.

Figure 7:
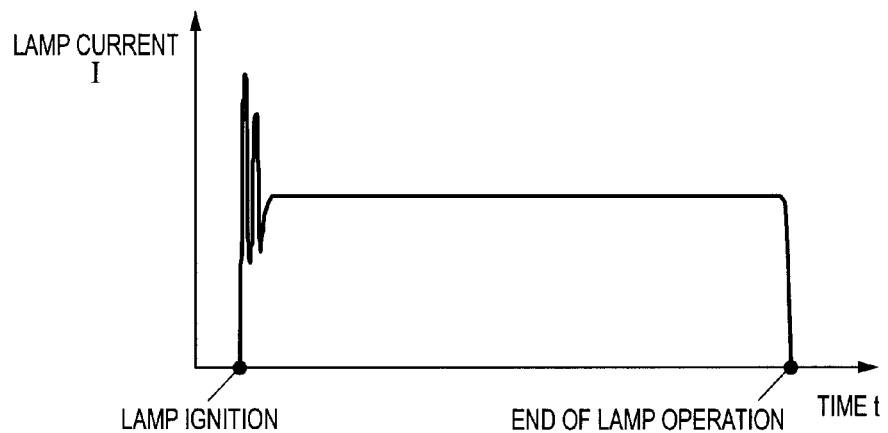
FIG. 7 is a graph showing a lamp current waveform of a conventional xenon lamp drive unit.

First, a reason why the lamp voltage is unstable among flashes when the conventional (steady output lamp current and constant) lamp current waveform shown in FIG. 7 is used is presumably as follows.

Figure 2A:
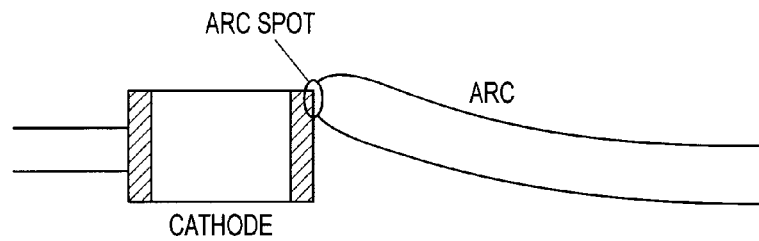
FIGS. 2A and 2B show states of an electrode of a xenon lamp in a case where a conventional xenon lamp drive unit is used.
Figure 2B:
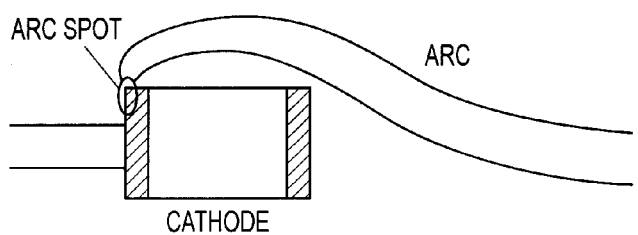
Figure 2C:
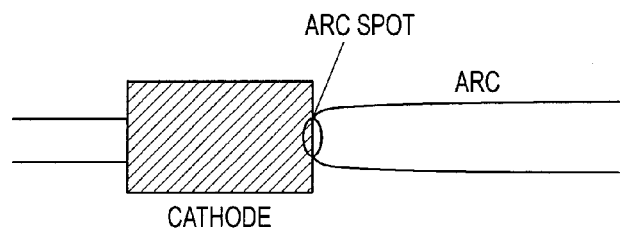
FIG. 2C shows a state of an electrode in a case where the xenon lamp drive unit of the present invention is used.

FIGS. 2A to 2C show an electrode shape of a cathode of the lamp 25. The electrode is cylindrical. When a pulse voltage is applied to the electrode, electrical breakdown of the lamp 25 occurs, and glow discharge starts. Here, the temperatures of end portions of the cylinder having small heat capacities are elevated first (the shaded portions in FIG. 2A to 2C represent portions where the temperatures are elevated). For this reason, electrons are readily discharged from those portions, and subsequently transition from the glow discharge to arc discharge occurs. Since the electrode is cylindrical, the end portions having small heat capacities are present at the tip and the root of the electrode. There arises no problem when the discharge occurs only from the tip of the electrode as shown in FIG. 2A. However, if the discharge occurs from the root as shown in FIG. 2B, the entire arc length is increased accordingly, and consequently the lamp voltage is increased.

In principle, the arc discharge occurs with the shortest arc length. Therefore, supplying a current for a long period of time allows the temperature of the entire electrode to be elevated, and the position of discharge moves to the tip of the electrode where the arc length is the shortest. In repetitive flashes in actual use, however, the discharge is conducted only for a period as short as several tens mSec to several hundreds mSec per flash. Thus, the temperature rises only in the end portions of the cylinder having small heat capacities and, therefore, the arc discharge is more likely to occur from the end portions.

Therefore, the present invention allows the temperature of the entire electrode to be rapidly increased as shown in FIG. 2C by supplying to the lamp a higher current than that in a usual state for a predetermined period of time after the electrical breakdown and ensuing ignition of the lamp (hereafter, "usual state" refers to a stable operation state for measurement with the artificial solar light irradiation). Specifically, in a first period after the lamp ignition, a high output lamp current having a higher current value than a steady output lamp current is supplied to the lamp in a constant current control. Thus, a rise in temperature of the entire electrode is facilitated in a short period of time after the ignition. As a result, the discharge occurs from the tip of the electrode where the arc length is the shortest every time, which allows the lamp voltage to be stabilized among flashes.

Figure 3:
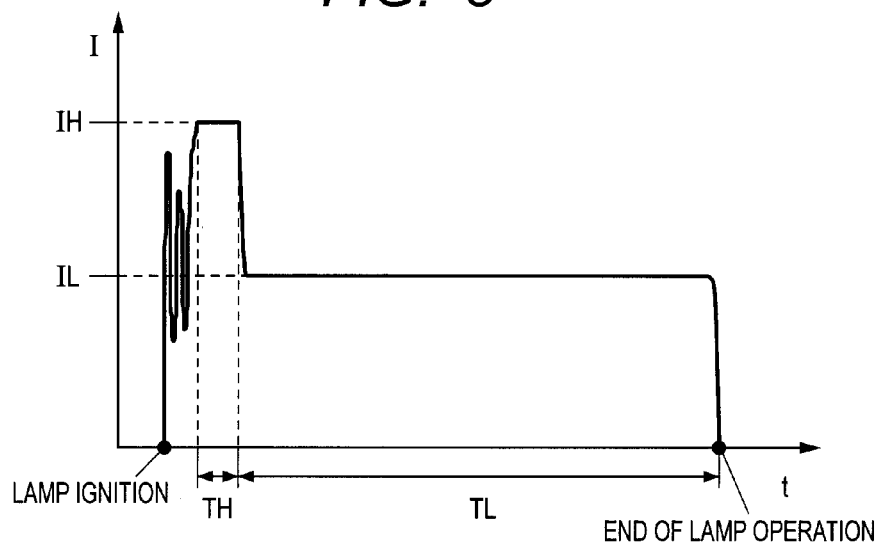
FIG. 3 is a graph for illustrating a current waveform of the xenon lamp drive unit of the present invention.
Figure 4:
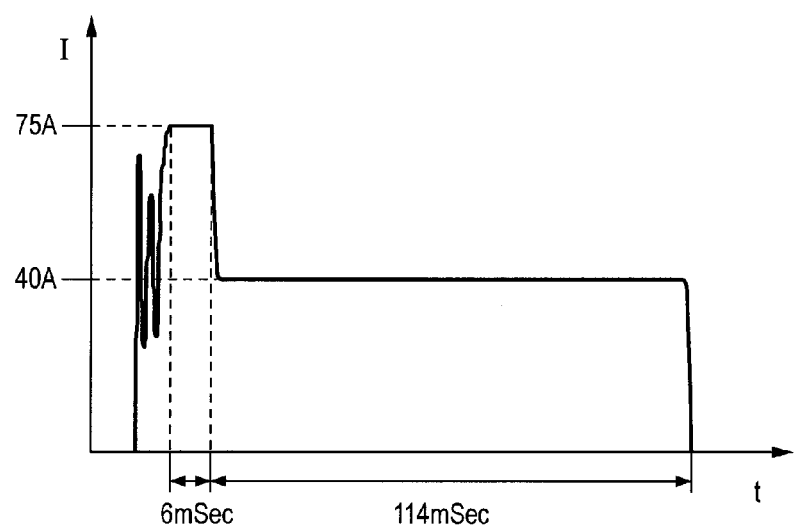
FIG. 4 is a graph for illustrating a current waveform of an embodiment of the present invention.

FIG. 3 shows a lamp current waveform of the present invention. The vertical axis represents the lamp current value, and the horizontal axis represents the lamp flashing time. In a first period corresponding to TH in FIG. 3 after the electrical breakdown and ensuing ignition of the lamp, the lamp is subjected to a high output operation with a lamp current value IH higher than that in the usual state. In a second period corresponding to TL in FIG. 3, steady operation of the lamp is applied with a lamp current value IL for the usual state. The current value of the high output lamp current and the time for which the high output lamp current is supplied may be determined experimentally. Note that the noise-like portion present immediately after the lamp ignition is mainly due to a rush current that is caused by the capacitor 19, and no current control is performed during this period.

More specifically, in the current control circuit 300, the CPU 26 inputs, to the error amplifier (negative terminal), a lamp current setting vale for high output operation in the first period TH and a lamp current setting vale for steady operation in the second period TL.

EXAMPLE

Stability of the lamp voltage was checked by using the lamp current waveform of the present invention. Note that the circuit arrangement is the same as that of FIG. 1 described above.

Figure 5:
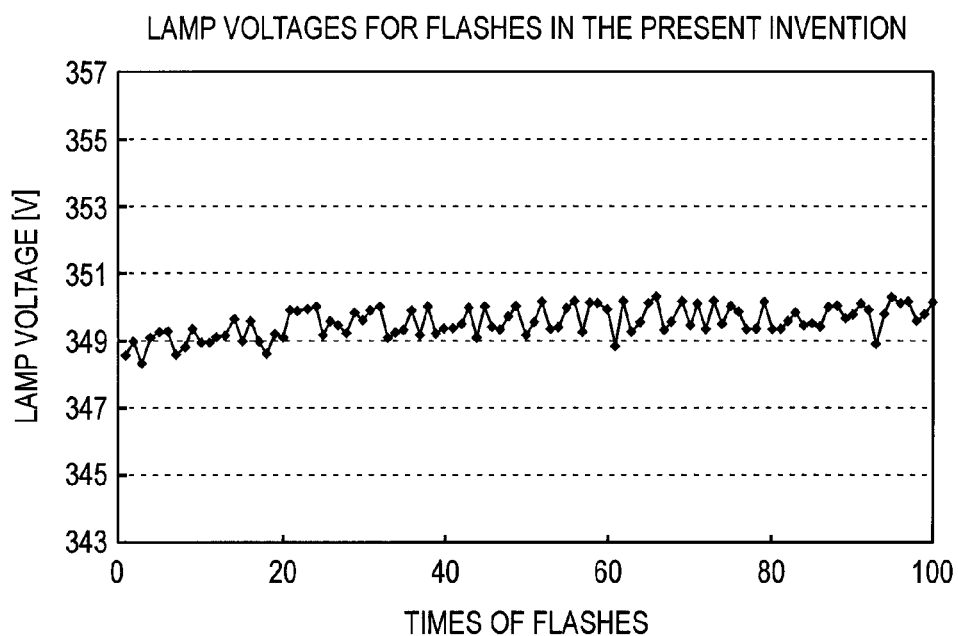
FIG. 5 is a graph showing lamp voltage values for respective flashes according to the xenon lamp drive unit of the present invention.

FIG. 5 shows a lamp current waveform of the present invention used in the experiment. A steady operation period was 114 mSec, and a lamp current value during steady operation was 40 A. A period for which a high output lamp current, which is one of the features of the present invention, was applied at an initial stage of the ignition was 6 mSec, and a current value thereof was 75 A.

Figure 8:
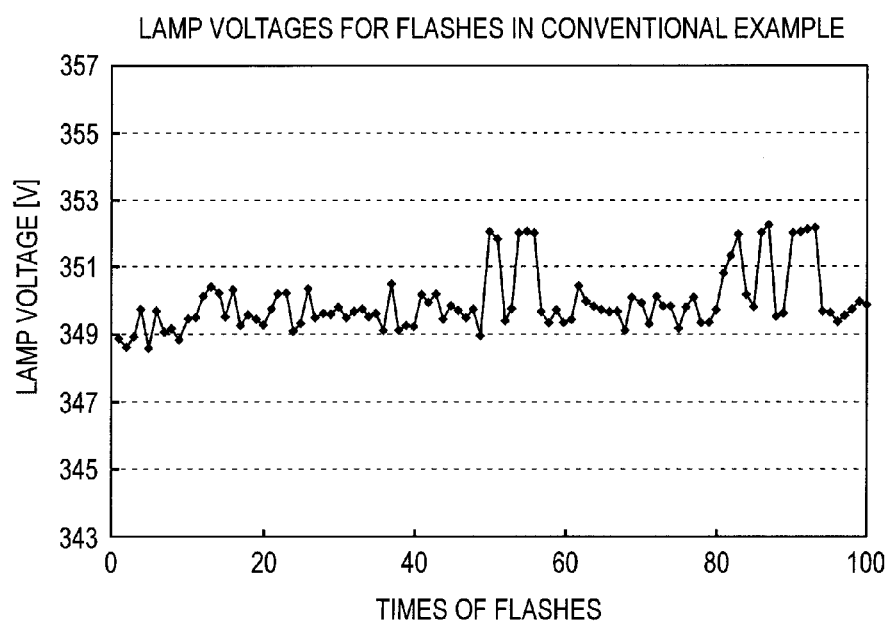
FIG. 8 is a graph showing lamp voltage values for respective flashes according to the conventional xenon lamp drive unit.

FIG. 5 shows change in lamp voltage among flashes in a case where the lamp current waveform (FIG. 3) according to the embodiment of the present invention was applied. FIG. 8 shows change in lamp voltage among flashes in a case where the lamp current waveform (FIG. 7) according to a conventional example was applied. In contrast to the conventional example of FIG. 8, no points with higher lamp voltages were observed in the embodiment of the present invention shown in FIG. 5, and it can be seen that a high stability was achieved.

From the results of the experiment, it has been found that the lamp voltage is stabilized among flashes by applying the current waveform of the present invention. This makes it possible to provide a xenon lamp drive unit and a method for driving a xenon lamp that provide a solution to the instability of illuminance which would otherwise occur due to instability of the lamp voltage, and therefore the illuminance can be stabilized among flashes.

Figure 6:
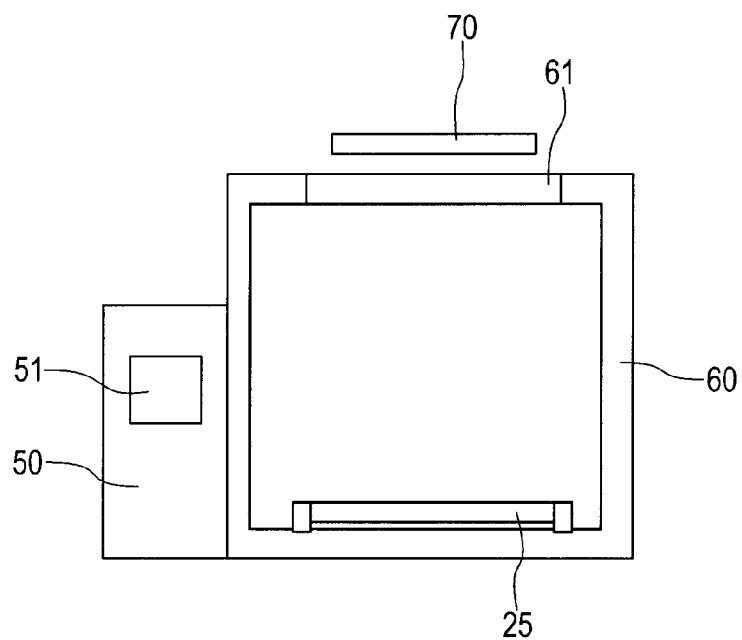
FIG. 6 shows an artificial solar light irradiation unit of the present invention.

FIG. 6 shows an artificial solar light irradiation unit of the present invention. The artificial solar light irradiation unit includes a controller 50, the xenon lamp drive unit 51 whose operation is controlled by the controller 50, a xenon lamp 25 connected to the xenon lamp drive unit 51 with wirings (not illustrated), and a casing 60 in which the xenon lamp 25 is attached. Irradiation is carried out in the casing 60 on a solar cell 70 attached to face the xenon the lamp 25. Since the above-described xenon lamp drive unit 51 is provided, an artificial solar light irradiation unit which is stabilized in terms of illuminance among flashes can be obtained.

Note that it is desirable in the first period (TH) that an actual lamp current be constant as a result of constant current control conducted with a current setting vale for high output operation (negative input of the error amplifier 22) being employed as a target value. However, the actual lamp current is not necessarily constant because of the effects of responsiveness of control or the time constant of the circuit. However, such cases are also included in the constant current control.

In addition, in the above-described embodiment, the lamp current waveform includes two levels of the high output lamp current (IH) and the steady output lamp current (IL). However, the lamp current waveform may include three levels or more, or the transition from the high output lamp current to the steady output lamp current may be conducted continuously.

Note that the case of the constant current control is described in the above-described embodiment, however, the present invention is also applicable to cases of constant power control. Also in the constant power control, if the lamp voltage is unstable, fluctuation of the lamp power may possibly occur because of control delay or the like. In such a case, since the illuminance also fluctuates, the present invention is effective as a solution for suppressing the fluctuation in illuminance.

Specifically, a configuration may be employed in which the current control circuit 300 includes a lamp voltage sensing circuit (not illustrated), and a multiplier (not illustrated) for multiplying a voltage sensed by a lamp voltage sensing circuit and a current (voltage) sensed by the current sensing resistor 20. In addition, a configuration may be employed in which an output (i.e., a lamp power) from the multiplier is inputted to an error amplifier 22 (positive terminal), a variable voltage signal from the CPU 26 proportional to a lamp power setting vale is inputted to the error amplifier 22 (negative terminal), and the PWM control circuit 21 performs a PWM control on the conduction time of the semiconductor switch 16 so that both inputs can be equal. As a result, a constant power control of direct current operation of the lamp 25 using the capacitor 13 as a power source is performed according to the lamp power setting vale. In addition, the current control circuit 300 may be configured such that the CPU 26 inputs to the error amplifier 22 (negative terminal) a lamp power setting vale for high output operation in the first period TH and a lamp power setting vale for steady operation in the second period TL.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-119032, filed May 27, 2011, which is hereby incorporated by reference herein in its entirety.

What is claimed is:

1. A xenon lamp drive unit comprising:
    a charging circuit; and
    a current control circuit adapted to supply a direct current to a xenon lamp for a flash by using a charged voltage of the charging circuit as a power source,
    wherein, in the flash, the current control circuit is adapted to supply, in a first period after a lamp ignition, a high output lamp current having a higher current value than a steady output lamp current to the xenon lamp by constant current control and supply, in a second period after the first period, the steady output lamp current to the xenon lamp by constant current control.

2. A method for driving a xenon lamp in a use of a xenon lamp drive unit including a current control circuit adapted to supply a direct current to a xenon lamp for a flash by using a charged voltage of a charging circuit as a power source, the method comprising the steps of:
    at the current control circuit, in the flash,
    in a first period after a lamp ignition, supplying a high output lamp current having a higher current value than a steady output lamp current to the xenon lamp by constant current control; and
    in a second period after the first period, supplying the steady output lamp current to the xenon lamp by constant current control.

3. An artificial solar light irradiation unit, comprising:
    the xenon lamp drive unit according to claim 1;
    a xenon lamp connected to the xenon lamp drive unit; and
    a casing in which the xenon lamp is attached.

* * * * *